US007004498B2

(12) United States Patent  
Daines et al.

(10) Patent No.: US 7,004,498 B2
(45) Date of Patent: Feb. 28, 2006

(54) COMPACT TETHERING SYSTEM AND METHOD FOR AN INFLATABLE CURTAIN

(76) Inventors: Michael Daines, 4643 S. 3100 W., Roy, UT (US) 84067; Kurt Kottke, 782 S. Davis Blvd., Bountiful, UT (US) 84010; Travis Hess, 1460 N. 1500 W., Farr West, UT (US) 84404; Atsushi Murakami, 3380 N. 400 E., North Ogden, UT (US) 84414; Kurt Gammil, 2298 N. 2050 E., Layton, UT (US) 84040

( * ) Notice: Subject to any disclaimer, the term of this patent is extended or adjusted under 35 U.S.C. 154(b) by 93 days.

(21) Appl. No.: 10/422,433

(22) Filed: Apr. 24, 2003

(65) Prior Publication Data

US 2004/0212185 A1    Oct. 28, 2004

(51) Int. Cl.
*B60R 21/22* (2006.01)
(52) U.S. Cl. .................. 280/730.2; 280/743.2
(58) Field of Classification Search ............. 280/730.2, 280/728.2, 730.1, 733, 749, 728.1, 743.2
See application file for complete search history.

(56) References Cited

U.S. PATENT DOCUMENTS

| | | | |
|---|---|---|---|
| 6,095,551 A * | 8/2000 | O'Docherty | 280/730.2 |
| 6,237,938 B1 | 5/2001 | Boxey | |
| 6,237,943 B1 | 5/2001 | Brown et al. | |
| 6,241,277 B1 | 6/2001 | Heigl et al. | |
| 6,308,982 B1 | 10/2001 | Wallner et al. | |
| 6,412,810 B1 | 7/2002 | Wipasuramonton et al. | |
| 6,431,588 B1 * | 8/2002 | Bayley et al. | 280/730.2 |
| 6,454,296 B1 * | 9/2002 | Tesch et al. | 280/730.2 |
| 6,464,250 B1 * | 10/2002 | Faigle et al. | 280/730.2 |
| 6,505,853 B1 * | 1/2003 | Brannon et al. | 280/730.2 |
| 6,688,641 B1 * | 2/2004 | Dominissini | 280/730.2 |
| 2002/0027340 A1 | 3/2002 | Koster | |
| 2003/0090091 A1 * | 5/2003 | Dominissini et al. | 280/730.2 |
| 2003/0111828 A1 * | 6/2003 | Dominissini | 280/730.2 |
| 2003/0168835 A1 * | 9/2003 | Thomas et al. | 280/730.2 |
| 2003/0234523 A1 * | 12/2003 | Henderson et al. | 280/730.2 |

* cited by examiner

*Primary Examiner*—Paul N. Dickson
*Assistant Examiner*—Toan To
(74) *Attorney, Agent, or Firm*—Sally J Brown

(57) ABSTRACT

The present invention provides a system and method for tethering that may be used to keep a cushion properly positioned for side impact protection, particularly in vehicles with limited space rearward of the cushion. A tethering assembly provides tension to keep the cushion in place. The tethering assembly may include a tether with first and second ends attached together such that the tether forms a loop. The first and/or second ends may also be attached to a lower portion of the cushion. Upper and lower anchors may be attached to a vehicle surface near the cushion to slidably retain the tether. When the cushion inflates, the first and second ends move downward. The lower anchor may be a locking mechanism that restricts withdrawal of the first end. During deployment and impact of a vehicle occupant with the cushion, the tensioning assembly exerts tension to keep the cushion in place.

26 Claims, 6 Drawing Sheets

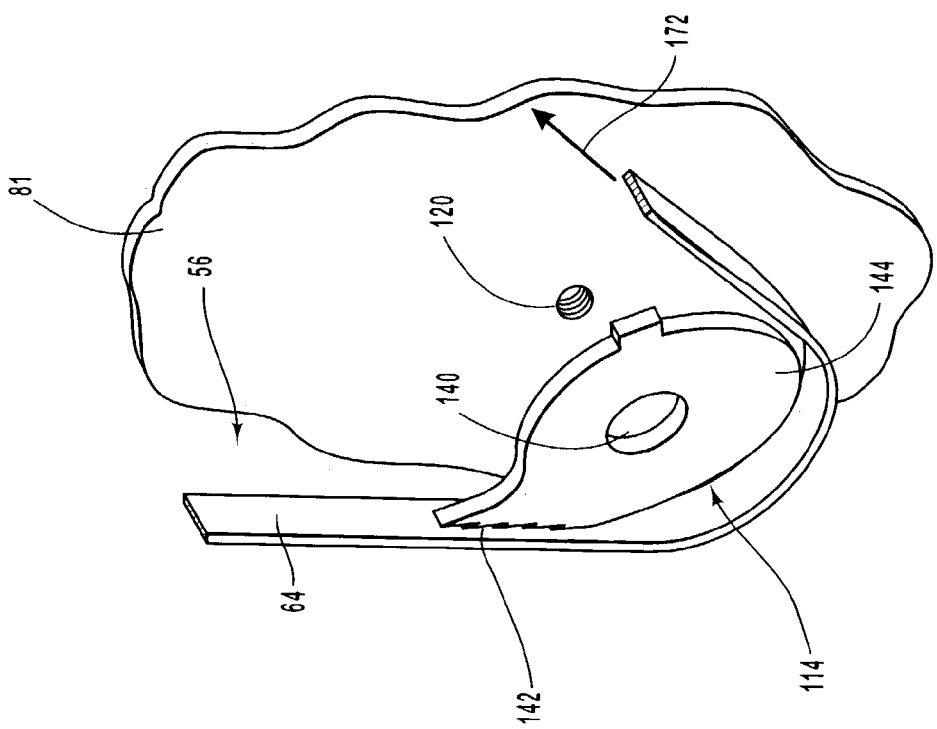
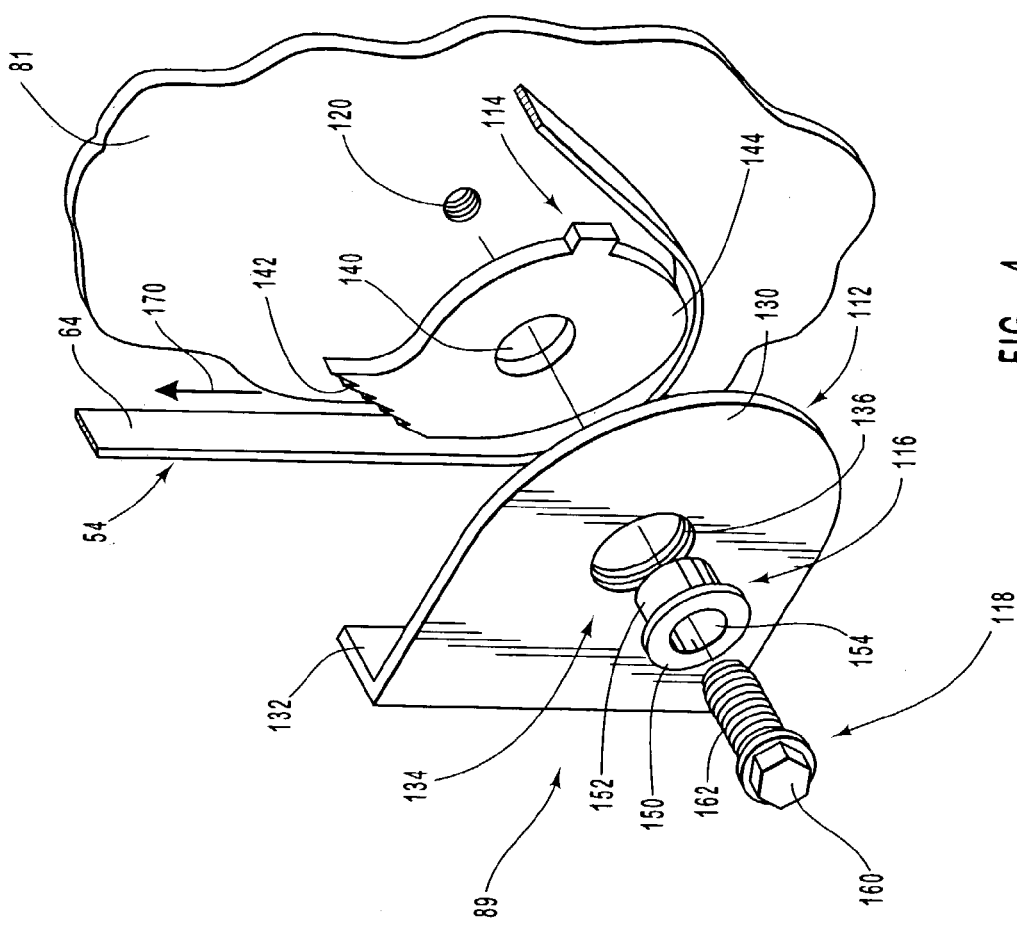

COMPACT TETHERING SYSTEM AND METHOD FOR AN INFLATABLE CURTAIN

BACKGROUND OF THE INVENTION

1. Field of the Invention

The present invention relates to systems and methods for protecting vehicle occupants from injury. More specifically, the present invention relates to a compact tethering system for maintaining the position of a cushion of an airbag system, such as an inflatable curtain designed to protect vehicle occupants against lateral impact.

2. Description of Related Art

The inclusion of inflatable safety restraint devices, or airbags, is now a legal requirement for many new vehicles. Airbags are typically installed in the steering wheel and in the dashboard on the passenger side of a car. In the event of an accident, an accelerometer within the vehicle measures the abnormal deceleration and triggers the explosion of pressurized gas from an inflator. Expanding gases from the inflator fill the airbags, which immediately inflate to protect the driver and/or a passenger from impact against the windshield, dashboard, and steering wheel.

Side impact airbags have also been developed in response to the need for protection from impact against the side of the vehicle (also known as lateral impact). These airbags, which are commonly referred to as "inflatable cushions" or "inflatable curtains," may be mounted in the vehicle over the doors, and may inflate during an accident to cover the windows, doors, and lateral surfaces of the vehicle. The inflatable cushion may also be connected to tethers that extend from the ends of the airbag to anchoring points within the vehicle. These tethers may exert tension on the inflated cushions to keep the cushions generally between the occupant and the lateral surface of the vehicle.

However, tether systems known in the art have a number of disadvantages. First of all, many known tether systems require that the tether be extended longitudinally away from both ends of the inflatable cushion. Consequently, the front tether must be extended from the front end of the inflatable cushion toward the front of the vehicle and the rear tether must be extended from the rear end of the inflatable cushion toward the rear of the vehicle. Such a design is incompatible with most trucks and sport utility vehicles ("SUVs") in which the passenger compartment of the vehicle ends abruptly behind a lateral surface over which it would be desirable to position a cushion. In these vehicles, there is typically insufficient space for tether extension rearward from the edge of the inflatable cushion. Accordingly, most known tethering systems cannot be used.

One of the main purposes in attaching a tethering system to an inflatable cushion is to protect the occupant by applying tension to the inflatable cushion to keep the inflatable cushion in the proper position. Without such tension, there is an inherent risk that the inflatable cushion will improperly inflate and injure the occupant. Additionally, during rollover conditions, if the inflatable cushion is not secured in the proper position via tethers, the motion of the occupant may force the inflatable cushion out of an open window, thereby eliminating any possible safety benefits of the inflatable cushion.

Additionally, many known inflatable cushions and tethering systems provide insufficient tension to prevent occupant excursion. "Occupant excursion" occurs when all or part of the vehicle occupant is extended or ejected from the vehicle, usually through an open door or window, during an accident. Obviously, occupant excursion can be very dangerous, especially during rollover conditions. However, since many known tethering systems permit the airbag cushion to move far enough to expose the window and door of the vehicle, these systems may not provide sufficient protection against occupant excursion.

Similarly, "bag slap" may occur when the cushion inflates inward of the window or door to strike an occupant. Many known tethering systems provide inadequate protection against bag slap.

Accordingly, a need exists for a tethering system suitable for use in vehicles that do not have sufficient interior space behind the inflatable cushion to extend a rear tether. Furthermore, a need exists for such a tethering system that tensions the cushion tightly enough to keep the cushion in place during inflation and impact of an occupant against the cushion. Such a tethering system should be cost effective to manufacture and install.

SUMMARY OF THE INVENTION

The apparatus of the present invention has been developed in response to the present state of the art, and in particular, in response to the problems and needs in the art that have not yet been fully solved by currently tethering systems. Thus, the present invention discloses tethering systems and related methods that provide adequate tension to prevent occupant excursion without requiring a great deal of space in the vehicle.

To achieve the foregoing, and in accordance with the invention as embodied and broadly described herein in the preferred embodiment, an enhanced tethering system and method are provided. According to one configuration, an inflatable curtain module may incorporate a cushion attached to a front tether anchoring point within the vehicle by a front tether, and to a rear tether anchoring point by a tethering assembly. The inflatable curtain module may be used in a vehicle with an abrupt rear surface disposed directly rearward of the inflatable curtain module.

The tethering assembly is designed to provide rearward tension on the inflated cushion, close to the waistline of the adjacent vehicle occupant. The tethering assembly includes a tether with a first end attached to a second end so that the tether forms a loop. An intermediate portion is disposed between the first and second ends. The first end is attached to a lower portion of the cushion.

The tether is coupled to a vehicle surface disposed directly rearward of the cushion by an upper anchor and a lower anchor. The upper anchor is an eyebolt that slidably captures the intermediate portion. The lower anchor is a locking mechanism designed to permit the intermediate portion to slide through the locking mechanism in one direction, while locking it against sliding in the opposite direction.

In response to detection of a collision, the cushion inflates downward, between the occupant and the adjacent lateral surface of the vehicle. The first and second ends of the tether are drawn downward with the lower portion of the cushion. The tether slides through the upper and lower anchors until the lower portion reaches its furthest extent. The first end is then disposed proximate the lower anchor.

When the occupant strikes the cushion, tension is transferred from the cushion to the front tether and to the tether of the tethering assembly, which is disposed rearward of the cushion. The tension urges the first end to move away from the lower anchor, or locking mechanism. The locking mechanism locks, thereby preventing the first end from moving away from the locking mechanism. Thus, tension is transmitted to the lower and upper anchors via the tether so that a complete tension line is established in the cushion, near the waist line of the occupant. As a result, the cushion remains in place to provide protection from lateral impact and excursion.

The locking mechanism has a bracket that generally contains a cam. The bracket is attached to the vehicle surface so that the cam is rotatably disposed between the bracket and the vehicle surface. The cam has a serrated face oriented generally toward a retaining lip of the bracket. The intermediate portion slides between the retaining lip and the serrated face.

During deployment, the tether slides through the locking mechanism in a direction that keeps the cam rotated such the serrated face does not press against the intermediate portion. However, once the cushion has deployed, impact of a vehicle occupant against the cushion pulls the tether in the opposite direction. As a result, the cam rotates such that the serrated face presses the intermediate portion against the retaining lip, thereby preventing the intermediate portion from sliding through the locking mechanism. As a result, the cushion is firmly held in place by the anchoring assembly to help reduce occupant injury.

According to one alternative embodiment, the tethering assembly is configured in a manner similar to that described above. However, a tensioning ring is added to increase the amount of tension provided by the tethering assembly. More precisely, the first and second ends of the tether may be attached together in a manner such that one side of the tensioning ring is sandwiched between them. The remainder of the tensioning ring extends around the opposite side of the loop formed by the tether.

Prior to deployment, the tensioning ring is disposed near the upper anchor, along with the first and second ends. As the cushion inflates, the tensioning ring is drawn downward, along the loop. The tensioning ring keeps opposite sides of the loop close to each other, thereby decreasing the slack in the loop and maintaining a higher level of tension on the cushion.

According to another alternative embodiment, the cushion has a hole that takes the place of the upper anchor. The hole is positioned in the upper portion of the cushion, toward the rearward edge of the cushion. A grommet or similar structure may be used to protect the cushion material surrounding the hole from tearing or abrasion. The tether forms a loop, as with the previous embodiment, and the first end is again attached to the cushion. The intermediate portion passes through the lower anchor and the hole.

Operation of the tethering assembly is similar to that described in the first embodiment. The first end is initially near the hole. As the cushion inflates, the first and second ends of the loop move downward toward the lower anchor. The intermediate portion slides through the lower anchor and the hole. Again, the lower anchor is configured as a locking mechanism that does not permit significant motion of the first end away from the locking mechanism. Hence, as with previous embodiments, when the occupant impacts the cushion, the tethering assembly cooperates with the front tether to provide a line of tension near the occupant's waist.

Through the use of the tethering systems of the present invention, an occupant of a vehicle can be protected from both inward inflation and excursion from the vehicle. Due to the compact design of the present invention, such protection is made available even in vehicles with limited longitudinal space for tether attachment.

These and other features and advantages of the present invention will become more fully apparent from the following description and appended claims, or may be learned by the practice of the invention as set forth hereinafter.

BRIEF DESCRIPTION OF THE DRAWINGS

In order that the manner in which the above-recited and other features and advantages of the invention are obtained will be readily understood, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 4 is an exploded, perspective view of the lower anchor of FIG. 1, during deployment of the inflatable curtain module;

FIG. 5 is an exploded, perspective view of a portion of the lower anchor of FIG. 1, after deployment of the inflatable curtain module;

DETAILED DESCRIPTION OF THE PREFERRED EMBODIMENTS

The presently preferred embodiments of the present invention will be best understood by reference to the drawings, wherein like parts are designated by like numerals throughout. It will be readily understood that the components of the present invention, as generally described and illustrated in the figures herein, could be arranged and designed in a wide variety of different configurations. Thus, the following more detailed description of the embodiments of the apparatus, system, and method of the present invention, as represented in FIGS. 1 through 7, is not intended to limit the scope of the invention, as claimed, but is merely representative of presently preferred embodiments of the invention.

The present invention provides a tethering system and method whereby problems associated with previously known tethering schemes can be resolved, particularly with application to vehicles with limited longitudinal tethering space. More specifically, through the use of looping tether attachment, rearward tension may be applied to the cushion without requiring that the rear tether be attached far rearward of the cushion.

Furthermore, application of the tension at the level of the occupant's waistline serves a dual purpose by keeping the cushion from moving inward as well as outward. Thus, vehicle occupants are effectively protected from excursion from the vehicle as well as from concussion due to improper inflation of the cushion. The manner in which the above described principles are implemented by the present invention will be described in greater detail with reference to FIGS. 1 through 7, as follows.

Figure 1:
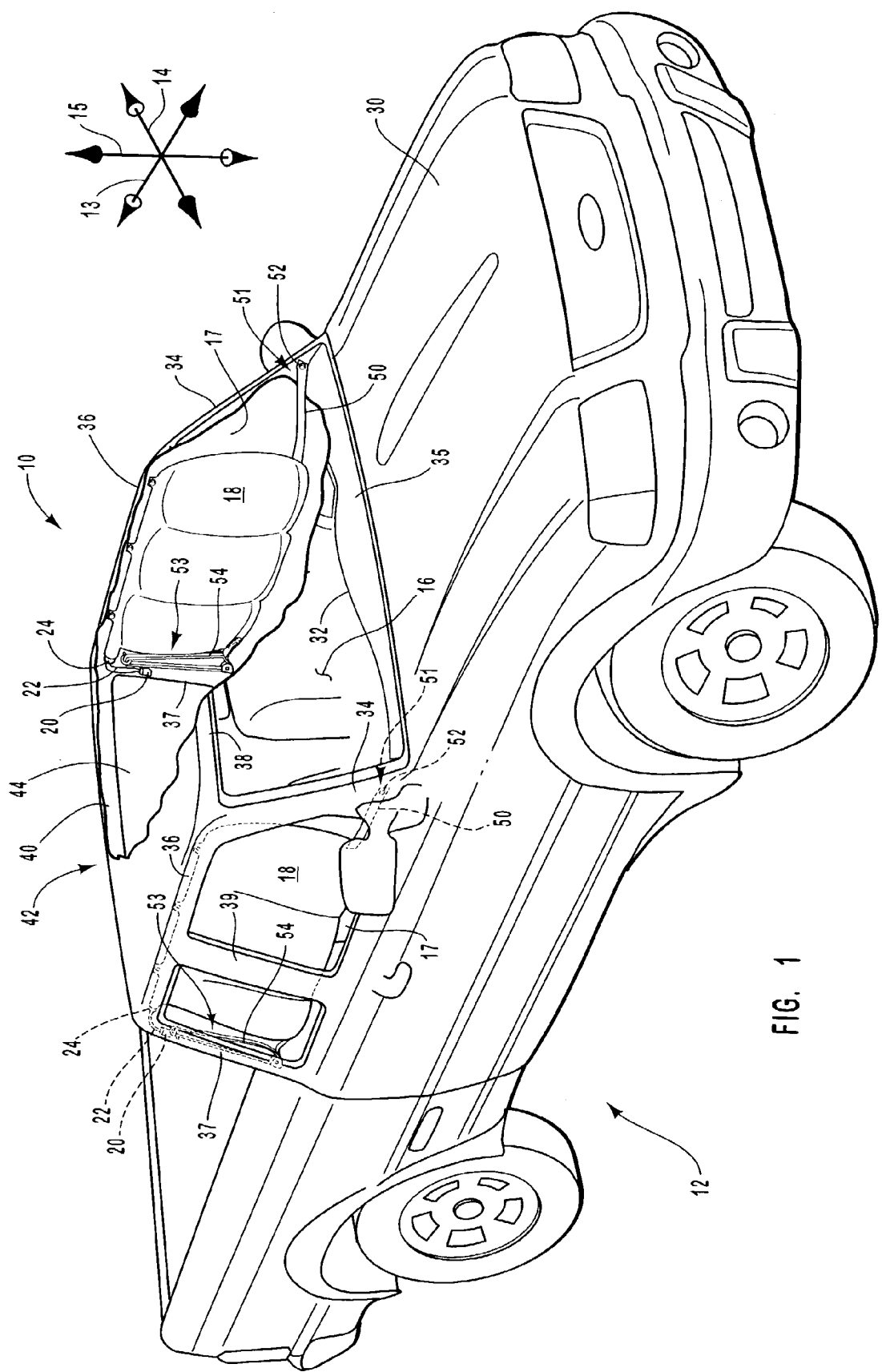
FIG. 1 is a perspective view of a vehicle with an inflatable curtain module including one embodiment of a tethering assembly according to the invention.

Referring to FIG. 1, an inflatable curtain module 10, (hereinafter "IC module"), according to one possible embodiment of the invention is shown installed in a vehicle 12. The IC module 10 may form part of an airbag system configured to protect one or more vehicle occupants against lateral impact through the formation of a protective curtain beside the occupants. As shown, the vehicle 12 is a compact truck; however, the IC module 10 may be incorporated in many different vehicle types.

The vehicle 12 has a longitudinal direction 13, a lateral direction 14, and a vertical direction 15. The vehicle 12 further has seats 16 laterally displaced from lateral surfaces 17, or doors 17, as shown in the vehicle 12 of FIG. 1. As shown, two IC modules 10 may be used: one for the driver's side of the vehicle 12, and the other for the passenger's side. Each of the IC modules 10 may have a cushion 18 and tethering systems to keep the cushion 18 in place, as will be described in greater detail subsequently.

One or more accelerometers 20 or other similar impact sensing devices detect sudden lateral acceleration (or deceleration) of the vehicle 12 and transmit electric signals via electric lines 22 to one or more inflators 24 that provide pressurized gas to inflate the cushions 18. As shown in FIG. 1, two separate inflators 24 may be used: one for each of the IC modules 10. The inflators 24 may be positioned rearward of the cushions 18, as shown, or may be disposed forward of the cushions 18 or at any other position that permits rapid gas flow from the inflators 24 to the cushions 18.

Each of the inflators 24 may take the form of a hollow pressure vessel containing a chemically reactive material and/or compressed gas that can be activated or released upon application of electricity to provide an outflow of inflation gases. In the exemplary configuration of FIG. 1, the inflators 24 are partially enveloped within the curtains 18 so that inflation gases exiting the inflators 24 flow directly into the curtains 18. The inflators 24 may operate with such rapidity that, before the vehicle 12 has fully reacted to the impact, the cushions 18 have inflated to protect vehicle occupants from impact.

Optionally, only one accelerometer 20 may be used, and may be stowed within an engine compartment 30 or dashboard 32 of the vehicle 12. A controller (not shown) may also be used to process the output from the accelerometer 20 and control various other aspects of a vehicle safety system of the vehicle 12. Such a controller may also, for example, be positioned in the engine compartment 30 or dashboard 32, proximate the accelerometer 20. In such a configuration, the electric lines 22 and/or other control wiring may be disposed along the A pillars 34 of the vehicle 12, on either side of the windshield 35, to reach the inflators 24. Alternatively, two accelerometers 20 may be used, and each may be positioned near one of the inflators 24, as shown in FIG. 1.

The inflators 24 and the curtains 18 may be attached to roof rails 36 of the vehicle 12. Depending on the model of the vehicle 12 and the desired configuration of the IC modules 10, airbag components may also be disposed within the doors 17 or along C pillars 37, a roof 38, B pillars 39, or a rear strut 40 extending between the C pillars 37.

The vehicle 12 shown in FIG. 1 is a compact truck; hence, the C pillars 37 are joined by an abrupt rear surface 42 with a rear window 44. The term "abrupt" refers to the near-vertical orientation of the abrupt rear surface 42. With many known inflatable curtain systems, rear tethers would extend a significant distance rearward of the cushion to provide rearward tension. However, the presence of the abrupt rear surface 42 makes traditional rear tethering schemes unusable because there is insufficient space rearward of the cushions 18. Consequently, side impact protection in trucks, SUVs, and certain minivans presents a unique problem, to which the present invention is addressed.

The cushions 18 may be tethered in such a manner that each of the cushions 18 is kept within the space beside the corresponding door 17, outward of the nearest vehicle occupant. Inward motion of the cushions 18 during inflation presents a risk of occupant injury due to bag slap, or collision of the cushions 18 with the occupants. Similarly, outward motion of the cushions 18 enables injury due to occupant ejection or the extension of a body part out of open doors 17 or windows.

In order to keep the cushions 18 properly positioned, each of the IC modules 10 may have a front tether 50 attached to the vehicle 12 at a front tether anchoring point 51. The front tether 50 may be attached through the use of a front tether anchor 52, such as a rivet, bolt, rotatable anchor plate, sewn attachment, or adhesive layer. The front tether anchoring point 51 may be located on the A pillar 34, as depicted in FIG. 1, or may be attached to other parts of the vehicle 12, as known in the art.

Each IC module 10 may also have a tethering assembly 53 positioned rearward of the cushions 18 to exert tension opposed to that of the front tether 50. The tethering assemblies 53 may each include a rear tether 54 disposed proximate the abrupt rear surface 42. The configuration and operation of the tethering assemblies 53 will be shown and described in greater detail subsequently.

Although each IC module 10 of FIG. 1 includes only a single cushion 18, the invention encompasses the use of inflatable curtain modules with any number of cushions. In vehicles with longer passenger compartments, such as SUVs, vans, and minivans, multiple cushions may be installed and, together or separately, coupled to front tethers and tethering assemblies like those of FIG. 1. Longer, unitary cushions may also be used with the tethering assemblies of the present invention.

Figure 2:
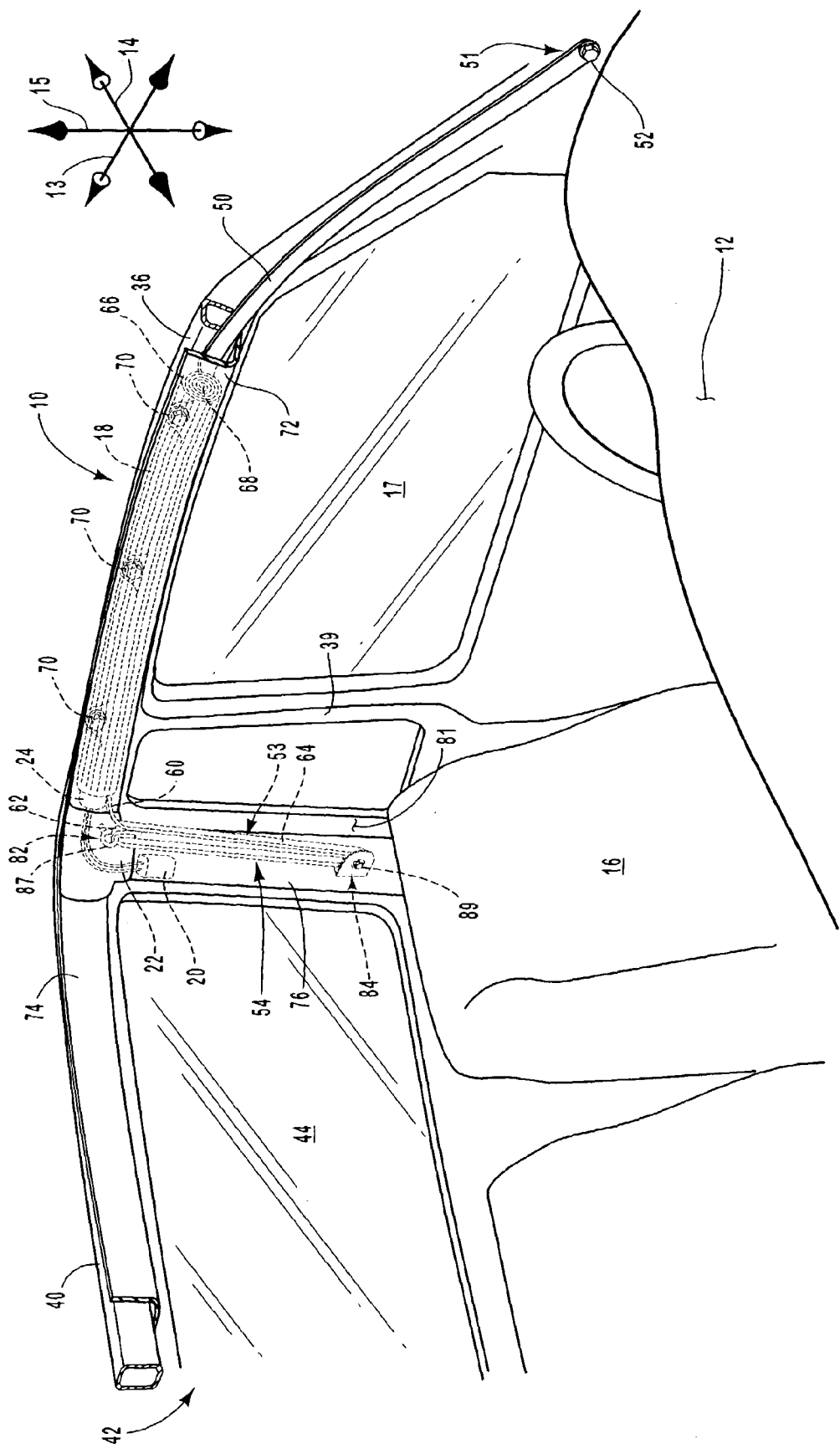
FIG. 2 is a cutaway, perspective view of the vehicle of FIG. 1, with the cushion in the stowed configuration.
Figure 3:
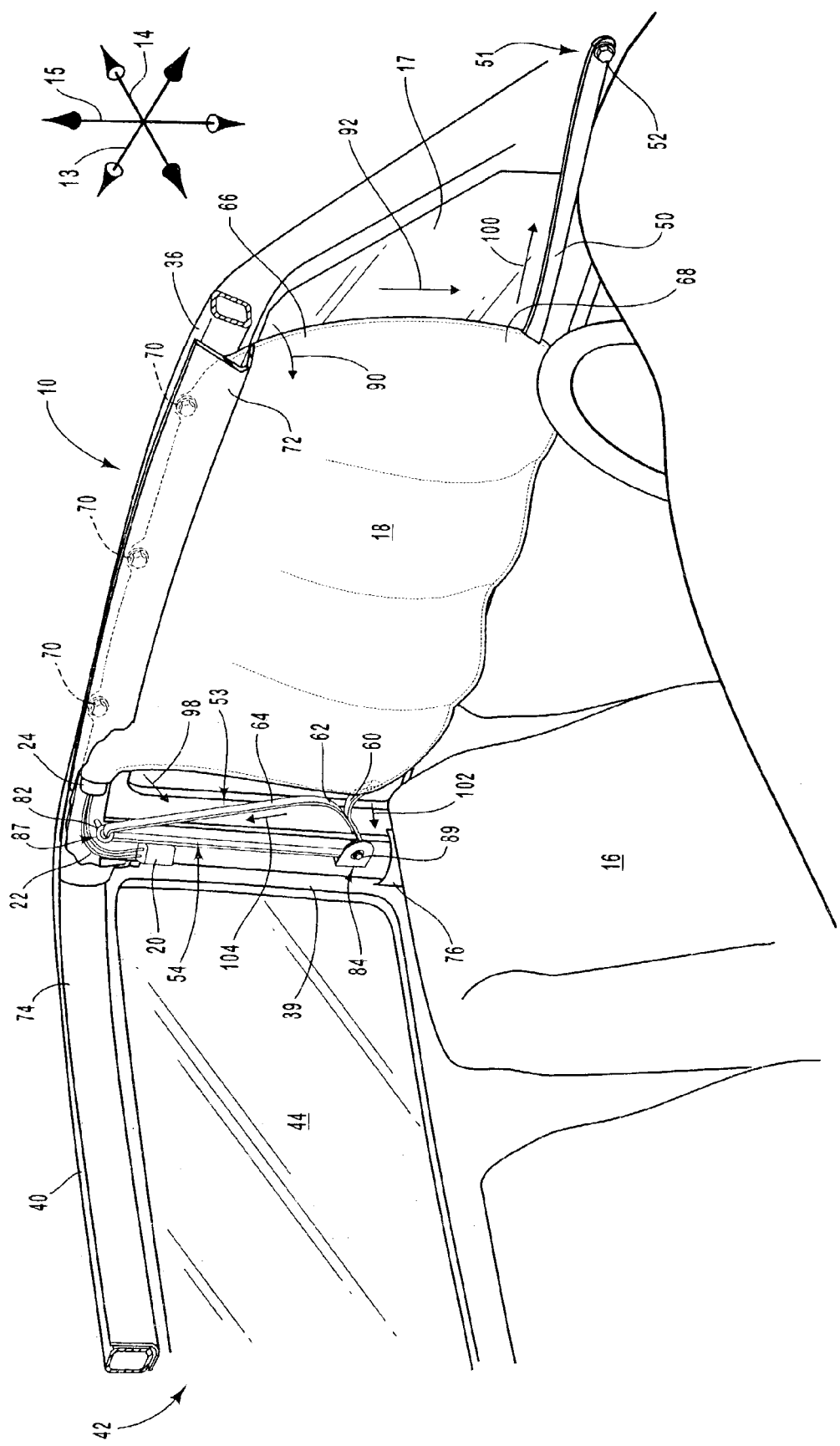
FIG. 3 is a cutaway, perspective view of the vehicle of FIG. 1, with the cushion in a deployed configuration.

The tethering assemblies 53 may be used to provide rearward tension to support the cushions 18 during inflation and impact of vehicle occupants against the cushions 18. The tethering assemblies 53 may also be concealed in an unobtrusive manner during normal operation of the vehicle. FIG. 2 shows one manner in which the tether assemblies 53 may be disposed when the IC modules 10 are in the stowed configuration, and FIG. 3 shows the disposition of the tethering assemblies 53 when the IC modules 10 have deployed to provide impact protection.

Referring to FIG. 2, a cutaway view of the driver's side of the vehicle 12 is shown, with the associated IC module 10 in the stowed configuration. Reference is now made to the IC module 10 of the driver's side. As shown, the tether 54 may have a first end 60, a second end 62, and an intermediate portion 64 between the first and second ends 60, 62.

The tether 54 is formed of a substantially inelastic material, such as a fabric webbing material like that used for seat belts. In this application, "substantially inelastic" refers to a material that does not stretch enough to permit significant motion of the cushion 18 due to elongation of the tether 54. Preferably, the tether 54 does not elongate to more than about 10% of its original length during deployment and impact of the vehicle occupant against the cushion 18. More preferably, the tether 54 does not elongate to more than about 5% of its original length. Yet more preferably, the tether does not elongate to more than about 1% of its original length during deployment and impact. Such inelastic tether construction provides greater tension, thereby enhancing the deployed stability of the cushion 18.

The first end 60 may be attached to the cushion 18, for example, by sewing. Other attachment methods such as fastening, RF welding, ultrasonic welding, adhesive bonding, and chemical bonding may alternatively be used. Alternatively, the tether 54 may be integral to the cushion 18, such as a sail, which is already known in the art. The second end 62 is attached to the first end 60 by a similar method such that the tether 54 forms a loop. Attachment of the first and second ends 60, 62 to form a loop may be beneficial because the tether 54 is then able to circulate to permit deployment of the cushion 18, and is also able to exert tension on a single part of the cushion to form a complete tension line, in concert with the front tether 50.

In the alternative to the looped configuration, the second end 62 may be attached directly to the cushion 18 proximate the first end 60, or to the cushion 18 and to the first end 60. The cushion 18 has an upper portion 66 attached to the vehicle 12 and a lower portion 68 that extends downward upon inflation of the cushion 18. The first and/or second ends 60, 62 of the tether 54 are attached to the lower portion 68.

As another alternative, the first and second ends 60, 62 may be attached together, such that the tether 54 forms a loop, but the intermediate portion 64 may be attached to the lower portion 68 of the cushion 18. The portion of the tether 54 that is attached to the cushion 18 may be called the cushion attachment portion of the tether 54. The cushion attachment portion may thus be the first end 60, the second end 62, the intermediate portion 64, or any combination thereof.

Returning to the embodiment depicted in FIG. 2, the upper portion 66 of the cushion 18 may be attached to the roof rail 36 through the use of attachment tabs 70, which may be integrally formed with the fabric of the cushion 18. A wide variety of other attachment mechanisms may also be used in conjunction with, or in place of, the attachment tabs 70. The cushion 18 may be compacted against the roof rail 36. As shown in FIG. 2, compaction may entail accordion folding the cushion 18 against the roof rail 36. Other compaction methods, such as rolling or crumpling, may also be used.

The cushion 18, in its stowed configuration, may be effectively concealed by roof rail trim 72. Rear strut trim 74 may be used to cover the rear strut 40, and rear side trim 76 may cover the tethering assembly 53. Other components of the IC module 10, such as the accelerometer 20, electric line 22, and inflator 24, may optionally be positioned behind the roof rail trim 72, the rear strut trim 74, the rear side trim 76, or some combination thereof.

The trim 72, 74, 76 may be constructed of a flexible material such as plastic that visually complements the remainder of the interior of the vehicle 12. Upon deployment of the cushion 18, the roof rail trim 72 and the rear side trim 76 may deflect to permit emergence of the cushion 18 and the tether 54, in a manner that will be shown and described in greater detail hereafter.

The tether 54 is movably anchored to a vehicle surface 81 disposed rearward of the lateral surface 17, underneath the rear side trim 76. More specifically, the intermediate portion 64 of the tether 54 is slidably retained at an upper anchoring point 82 and a lower anchoring point 84, both of which are disposed on the vehicle surface 81. The upper and lower anchoring points 82, 84 may be nearly aligned in the longitudinal and lateral directions 13, 14, so that the anchoring points 82, 84 are simply displaced from each other in the vertical direction 15. Thus, the anchoring points 82, 84 are disposed substantially on a single vertical line.

An upper anchor 87 is disposed at the upper anchoring point 82. Similarly, a lower anchor 89 is disposed at the lower anchoring point 84. Each of the anchors 87, 89 may include one or more of the following: bolts, anchor plates, rivets, sewn attachments, adhesive interfaces, welded interfaces, or any other known attachment mechanism. The anchors 87, 89 are generally made to slidably retain the intermediate portion 64 to permit downward motion of the first end 60 as the cushion 18 inflates. Each of the anchors 87, 89 has an aperture, which is simply any type of opening through which the intermediate portion 64 may pass to be slidably retained.

In the configuration of FIG. 2, the upper anchor 87 takes the form of an eyebolt with an eye, through which the intermediate portion 64 is inserted. The lower anchor 89 takes the form of a locking mechanism configured to permit the intermediate portion 64 to slide through the locking mechanism 89 in only one direction. The operation of the tethering assembly 53 will be explained in greater detail with reference to FIG. 3.

Referring to FIG. 3, a cutaway view of the driver's side of the vehicle 12 is shown, with the associated IC module 10 in the deployed configuration. When the accelerometer 20 detects a sudden change in velocity, the inflator 24 may deploy to inject expanding gases into the cushion 18. The cushion 18 may then unfold to extend generally downward from the roof rail 36.

In order to permit the cushion 18 to escape from the roof rail trim 72, the roof rail trim 72 may be attached to the roof rail 36 in such a manner that the lower edge of the roof rail trim 72 can open in an opening direction indicated by the arrow 90. The cushion 18 may then unfold to extend in a deployment direction, shown by the arrow 92. The cushion 18 may initially be folded in such a manner that the accordion folds unfold generally downward.

If the cushion 18 were to be compacted by rolling, the tethers 50, 54 may be expected to twist as the cushion 18 unrolls. Twisting may not impair the operation of the tethers 50, 54, and may even increase the tension exerted by the tethers 50, 54 against the cushion 18 because the tethers 50, 54 shorten as twisting occurs. Thus, although the cushion 18 is shown with the accordion fold, the present invention is also usable with rolled cushions.

The first end 60 of the tether 54 may also move in the deployment direction 92 as the cushion 18 deploys. More precisely, the loop formed by the tether 54 circulates in a clockwise direction through sliding of the intermediate portion 64 through the eyebolt 87 and the locking mechanism 89. The result is motion of the first and second ends 60, 62 generally in the vertical direction 15. If desired, the rear side trim 76 may break away from the abrupt rear surface 42 and/or the vehicle surface 81 in an opening direction 98 to permit the first and second ends 60, 62 of the tether 54 to slide vertically behind the rear side trim 76 while the cushion 18 inflates.

When the IC module 10 has reached the deployed configuration, as shown in FIG. 3, the front and rear tethers 50, 54 may provide tension in generally opposite directions to hold the cushion 18 in place. More specifically, the front tether 50 may provide tension in a front tension direction 100. The rear tether 54 may provide tension in a rear lower tension direction 102 toward the locking mechanism 89 and a rear upper tension direction 104 toward the eyebolt 87.

The tension provided by the tethers 50, 54 is induced by shortening of the cushion 18 during inflation, and by impact of the occupant against the cushion 18. Hence, little, if any tension may exist in the rear upper tension direction 104, while significant tension exists in the rear lower tension direction 102. The locking mechanism 89 operates to permit the intermediate portion 64 to slide through the locking mechanism 89 such that the loop circulates in a clockwise direction. However, counterclockwise motion is restricted by the locking mechanism 89.

Thus, upon impact of the occupant against the cushion 18, the portion of the tether 54 between the first end 60 and the locking mechanism 89 is drawn taut and the first end 60 cannot be significantly withdrawn from the locking mechanism 89. The tether 54 cooperates with the front tether 50 to pull directly forward and rearward against the lower portion 68 of the cushion 18, so that the cushion 18 is unable to significantly pivot inward or outward.

Consequently, the occupants of the vehicle 12 are protected against vehicle excursion as well as from inward inflation of the cushion 18. Furthermore, the cushion 18 may be kept from motion in the longitudinal direction 13 or from any other undesirable pivotal motion. The front and rear tethers 50, 54 may provide tension at or near the level of the occupant's waistline to support the cushion 18 along its entire vertical length, and to reduce the likelihood that any body part will pass underneath the cushion 18 to impact the upper door 17.

The IC module 10 may be manufactured in a comparatively simple manner. According to one exemplary manufacturing method, the cushion 18 and the tether 54 may be separately manufactured. If desired, the cushion 18 may be made through lay flat construction through the use of one-piece woven (OPW) techniques, sewing, RF welding, ultrasonic welding, or other attachment methods. The tether 54 may simply be cut from a length of webbing material or the like.

The upper and lower anchors 87, 89, i.e., the eyebolt 87 and the locking mechanism 89, may be specially manufactured or, in some embodiments, obtained as off-the-shelf components. The tether 54 may be inserted into the aperture of the eyebolt 87 so that the intermediate portion 64 of the tether 54 is slidably retained by the eyebolt 87. The first and second ends 60, 62 of the tether 54 may then be attached together. The tether 54 then forms a loop from which the eyebolt 87 cannot be withdrawn without detaching the first and second ends 60, 62 from each other.

After the first and second ends 60, 62 have been attached together, the tether 54 may be attached to the lower portion 68 of the cushion 18. As mentioned previously, the first end 60 may be sewn or otherwise attached to the cushion 18, or in the alternative, other portions of the tether 54 may instead be attached to the cushion 18. The front tether 50 may also be cut from a length of webbing material or the like. The front tether 50 may also be attached to the cushion 18.

Thus, the IC module 10, as delivered to the automaker, may be fully assembled, aside from the locking mechanism 89. The automaker may install the IC module 10 in the vehicle 12 by, first, attaching the upper portion 66 of the cushion 18 to the vehicle 12 (e.g., to the roof rail 36, as shown in FIG. 3) and attaching the front tether 50 to the front tether anchoring point 51. The automaker may then attach the eyebolt 87 to the vehicle surface 81 and then attach the locking mechanism 89 to the vehicle surface 81 over the intermediate portion 64 of the tether 54.

The inflator 24 may also be anchored to the roof rail 36 or another structural feature of the vehicle 12, if necessary.

The inflator 24 is connected to the vehicle collision management system. The trim 72, 74, 76 may then be installed to cover the various component of the IC module 10.

According to the above described manufacturing method, the locking mechanism 89 does not retain the tether 54 until the locking mechanism 89 is installed against the vehicle surface 81. The configuration and operation of this embodiment of the locking mechanism 89 will be shown and described in greater detail in connection with FIGS. 4 and 5. In order to simplify the installation procedure, the locking mechanism 89 may alternatively be designed to remain slidably attached to the tether 54 prior to attachment of the locking mechanism 89 to the vehicle surface 81. A backing plate or the like (not shown) may be added to the locking mechanism 89 for this purpose.

Referring to FIG. 4, an exploded, perspective view of one embodiment of the locking mechanism 89 is shown. As depicted, the locking mechanism 89 has a bracket 112, a cam 114, a spacer 116, and a bolt 118. The locking mechanism 89 is attached to the vehicle surface 81 via an attachment hole 120 formed in the vehicle surface 81.

The bracket 112 may be made of a metal, or alternatively, of a plastic, ceramic, or composite. As shown, the bracket 112 has a face 130 and a retaining lip 132 attached to the face 130 in near-perpendicular fashion. The face 130 has a hole 134 that extends through a shaft (not shown) extending rearward of the face 130. The hole 134 has a counterbore 136 toward the face 130.

The cam 114 has a hole 140 sized to receive the shaft of the bracket 112 with clearance, so that the cam 114 can rotate about the shaft. Additionally, the cam 114 has a serrated face 142 disposed at a predetermined angle, as well as a lobe 144 on the opposite side of the hole 140 from the serrated face 142.

The spacer 116 has an enlarged portion 150 and a narrow portion 152, each of which has a generally cylindrical shape. A hole 154 extends through the enlarged portion 150 and the narrow portion 152. The bolt 118 has a head 160 and threaded portion 162 sized to fit through the hole 154 of the spacer 116 and into the attachment hole 120 of the vehicle surface 81. If desired, the attachment hole 120 and/or the hole 154 may be threaded to receive the threaded portion 162 of the bolt 118.

The narrow portion 152 of the spacer 116 fits into the counterbore 136 of the bracket 112, as depicted. The cam 114 is inserted into engagement with the bracket 112 such that the shaft of the bracket 112 is disposed within the hole 140 of the cam 114. The bracket 112, the cam 114, and the spacer 116 are all retained against the vehicle surface by inserting the threaded portion 162 of the bolt 118 through the spacer 116, through the hole 134 of the bracket 112, and into the attachment hole 120. The bolt 118 may threadably engage the hole 120 to keep the bracket 112, the cam 114, and the spacer 116 in place.

When the locking mechanism 89 has been assembled and attached to the vehicle surface 81, the retaining lip 132 and the shaft of the bracket 112 may abut the vehicle surface 81. The intermediate portion 64 of the tether 54 extends around the cam 114, as shown, to run between the cam 114 and the retaining lip 132.

While the cushion 18 is inflating, tension is exerted on the tether 54 along the direction indicated by the arrow 170, inducing the tether 54 to circulate in the clockwise direction with respect to the eyebolt 87 and the locking mechanism 89. As the intermediate portion 64 slides past the lobe 144, the cam 114 tends to remain oriented such that the serrated face 142 does not abut against the intermediate portion 64.

Thus, the intermediate portion 64 is able to pass relatively freely between the cam 114 and the retaining lip 132.

Referring to FIG. 5, a perspective view shows a portion of the vehicle surface 81, a portion of the intermediate portion 64 of the tether 54, and the cam 114 in a locking arrangement. When the cushion 18 reaches its fully deployed position, the tether 54 stops circulating in the direction indicated by the arrow 170 of FIG. 4. Impact of the vehicle occupant against the cushion 18 then draws the tether 54 in the opposite direction, i.e., in the direction indicated by the arrow 172.

As the tether 54 moves in the direction indicated by the arrow 172, friction of the tether 54 against the lobe 144 induces the cam 114 to rotate in the counterclockwise direction. As a result, the serrated face 142 presses against the intermediate portion 64, sandwiching the intermediate portion 64 between the serrated face 142 and the retaining lip 132.

Further motion of the tether 54 toward the direction indicated by the arrow 172 is arrested by the friction between the serrated face 142 and the retaining lip 132. Such further motion tends to pull the serrated face 142 into tighter engagement with the intermediate portion 64. Hence, the locking mechanism 89 tightens under increased tension in the direction indicated by the arrow 172.

Consequently, the locking mechanism 89 locks in response to pressure of the occupant against the cushion 18. The cushion 18 is unable to significantly move from its deployed position, and therefore protects the occupant against excursion from the vehicle 12.

Numerous other locking mechanisms, such as locking wedges and other cam arrangements, may be used in place of the locking mechanism 89. Furthermore, such a locking mechanism may be provided in addition to a separate, independent lower anchor. According to one alternative embodiment, a locking mechanism may take the form of a funnel (not shown) that either encircles the tether 54 or impinges against the tether 54 from opposite sides.

For example, the funnel may be formed from two stamped strips of metal, each of which has a sloping portion and a parallel portion. The strips of metal may be attached to the vehicle surface 81 in such a manner that the intermediate portion 64 is disposed between the strips of metal. The parallel portions grip the intermediate portion 64 such that the tether 54 can be pulled through the sloping portions and then into the parallel portion. However, the intermediate portion 64 cannot be pulled into the parallel portion in the opposite direction, i.e., without first moving through the sloping portions.

If desired, the lower anchor may then take the form of an eyebolt like that of the upper anchor, and then the funnel may be disposed above the lower anchor with the sloping portions below the parallel portions. Thus, the funnel would operate in a manner similar to that of the locking mechanism 89 to permit circulation of the tether 54 in a direction corresponding to deployment of the cushion 18, while preventing motion in the opposite direction during occupant impact against the cushion 18.

Returning to the locking mechanism 89 of FIGS. 4 and 5, the locking mechanism 89 may be designed to capture the tether 54 prior to attachment of the locking mechanism 89 to the vehicle surface 81. For example, a backing plate (not shown) may be added to the locking mechanism 89 of FIG. 4. Such a backing plate may be disposed between the locking mechanism 89 and the vehicle surface 81. The bolt 118 may be used to attach the bracket 112, the cam 114, and the spacer 116 to the backing plate. The tether 54 may then be inserted into the aperture formed by the juncture of the bracket 112 with the backing plate. The bolt 118 may protrude through the backing plate so that the bolt 118 can still be used to attach the locking mechanism 89 to the vehicle surface 81.

One advantage of such an embodiment is that, like the eyebolt 87, the locking mechanism 89 may be securely coupled to the tether 54 prior to delivery of the IC module 10 to the automaker. Installation of the IC module 10 is facilitated by the fact that the locking mechanism 89 need not be assembled or aligned with the tether 54 prior to attachment to the vehicle surface 81.

Many alternative tethering schemes may also be used to provide cushion securement in a manner similar to that of the tethering assembly 53 described above. Two such alternatives will be shown and described in connection with FIGS. 6 and 7, as follows.

Figure 6:
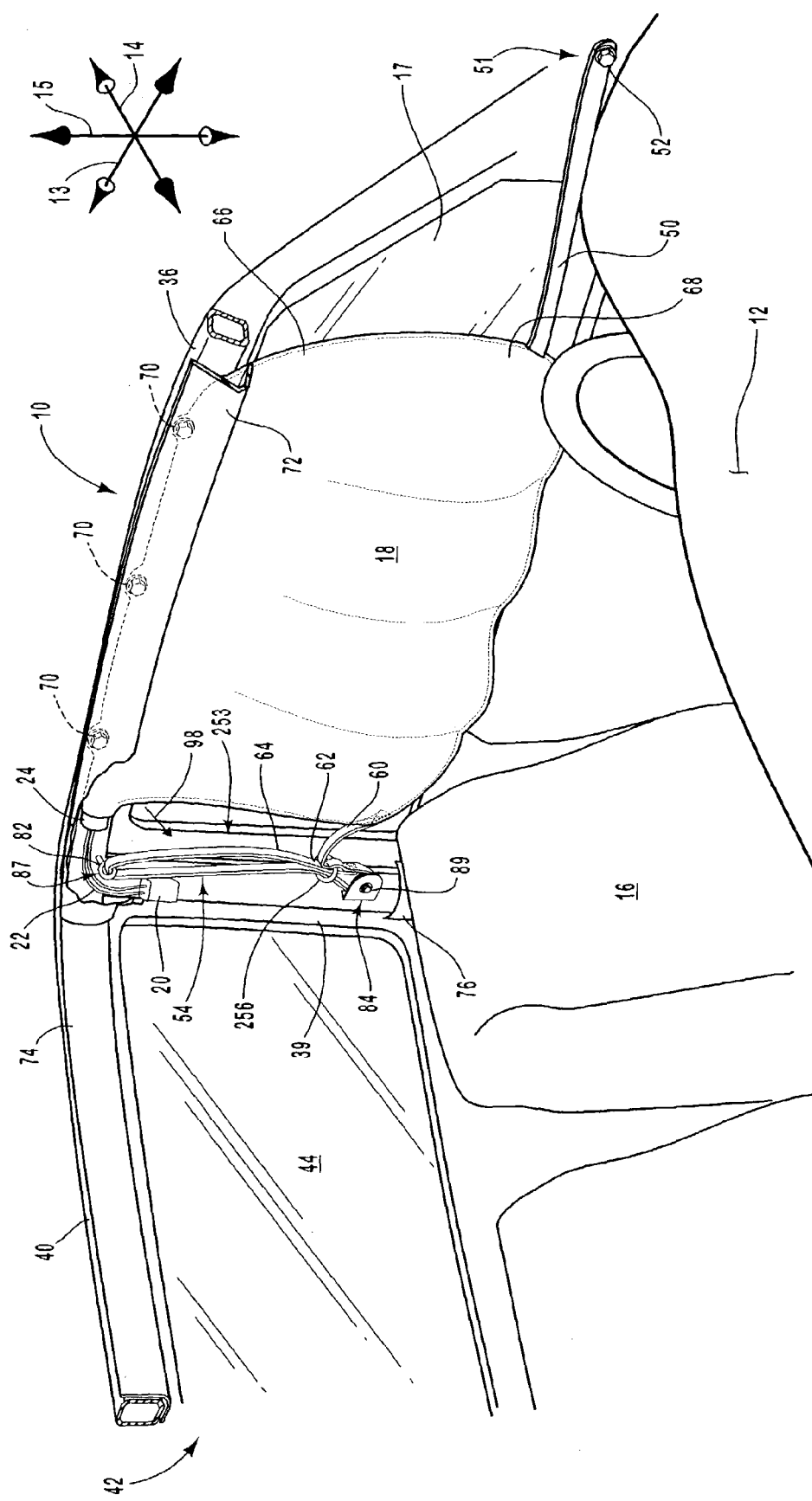
FIG. 6 is a cutaway, perspective view of a vehicle with an inflatable curtain module including one alternative embodiment of a tethering assembly according to the invention.

Referring to FIG. 6, a perspective view illustrates an inflatable curtain module, or IC module 210, according to another embodiment of the invention. The IC module 210 is shown installed in a vehicle 12, as described previously, with an abrupt rear surface 42. Like the IC module 10, the IC module 210 has a cushion 18 and a front tether 50 attached to the cushion 18. A tethering assembly 253 restrains motion of the rear end of the cushion 18.

Like the tethering assembly 53, the tethering assembly 253 has a tether 54 with first and second ends 60, 62 attached together to form a loop, and an intermediate portion 64 between the first and second ends 60, 62. The first end 60 is attached to the cushion 18 and the intermediate portion 64 is slidably retained by an upper anchor 87 and a lower anchor 89. Again, the upper anchor 87 is an eyebolt and the lower anchor 89 is a locking mechanism, like that if FIGS. 4 and 5.

The tethering assembly 253 differs from the tethering assembly 53 described previously in that the tethering assembly 253 includes a tensioning ring 256. The tensioning ring 256 may take the form of a circular metal ring attached on one side to the first end 60. For example, a portion of the tensioning ring 256 may be sandwiched between the first and second ends 60, 62, and the first and second ends 60, 62 may be sewn together on either side of the portion of the tensioning ring 256 so that the portion of the tensioning ring is captured between the first and second ends 60, 62. The opposite portion of the tensioning ring 256 extends around the intermediate portion 64 of the tether 54, between the eyebolt 87 and the locking mechanism 89.

Initially, the tensioning ring 256 is disposed adjacent to the eyebolt 87. When the cushion 18 inflates, the tensioning ring 256 is carried downward with the first end 60. The tensioning ring 256 slides against the intermediate portion 64, keeping the intermediate portion 64 next to the first end 60. When the cushion 18 is fully inflated, the tensioning ring 256 is nearer the locking mechanism 89, as depicted in FIG. 6.

The tether 54 may be expected to have a certain amount of slack. The tensioning ring 256 increases the length of the path through which the tether 54 travels, thereby decreasing the amount of play in the tether 54. Thus, the cushion 18 may be somewhat more tightly restrained in the rearward direction through the use of the tensioning ring 256.

Figure 7:
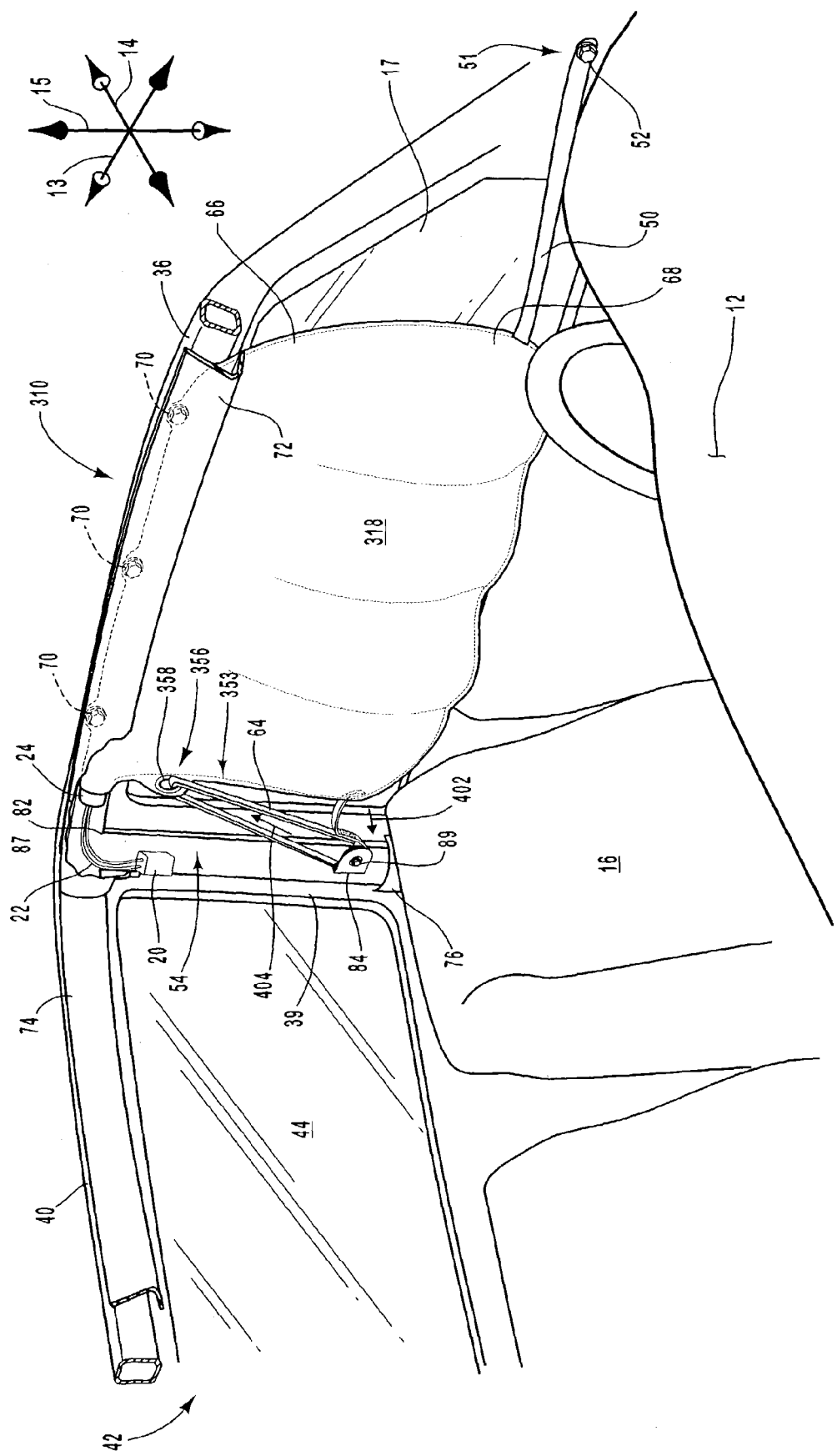
FIG. 7 is a cutaway, perspective view of a vehicle with an inflatable curtain module including another alternative embodiment of a tethering assembly according to the invention.

Referring to FIG. 7, a perspective view depicts an inflatable curtain module, or IC module 310, according to another alternative embodiment of the invention. The IC module 310 is also shown installed within a vehicle 12 with an abrupt rear surface 42. The IC module 310 has a cushion 318, which is somewhat similar to the cushion 18 of the previous embodiments. Additionally, the IC module has a front tether 50 to restrain the front end of the cushion 318, and a tethering assembly 353 to restrain the rear end of the cushion 18.

The tethering assembly 353 has a tether 54 like those of the previous embodiments. The tether 54 has a first end 60 and a second end 62, which are attached together so that the tether 54 forms a loop. An intermediate portion 64 is disposed between the first and second ends 60, 62. The intermediate portion 64 is slidably engaged by a lower anchor 89, which takes the form of a locking mechanism 89.

However, no upper anchor is provided. Rather, the cushion 318 has a hole 356 adjacent to its upper edge. The tether 54 passes through the hole 356 so that the cushion 318 provides the function of the upper anchor. A grommet 358 may be positioned within the hole 356 to enable the tether 54 to slide relatively freely through the hole 356.

Thus, when the cushion 318 inflates, the first end 60 is drawn downward, and the tether 54 circulates, as with the previous embodiments. Again, the locking mechanism 89 restricts withdrawal of the first end 60 from the lower anchor 62 to provide tension in a rear lower tension direction 402 and a rear upper tension direction 404. The result is the formation of a line of tension generally along the vehicle occupant's waistline, which protects the occupant against excursion from the vehicle 12. If desired, a tensioning ring like that of FIG. 6 may also be used in conjunction with the tethering assembly 353.

The IC module 310 may be manufactured and prepared for installation in a manner similar to that of the previous embodiments. The cushion 318 may first be manufactured, and the hole 356 may be formed through punching, cutting, or a similar operation. The grommet 358 may be installed in the cushion 318. The front tether 50 is attached to the cushion 318, and the tether 54 is inserted through the grommet 358. The first and second ends 60, 62 may be attached together, and the first end 60 may be attached to the cushion 318.

The IC module 310 may then be shipped to the automaker. The automaker may install the IC module 310 by attaching the cushion 318 to the roof rail 36, attaching the inflator 24 to any necessary restraints or wiring, and attaching the locking mechanism 89 to the vehicle surface 81 to slidably restrain the intermediate portion 64.

The tethering systems and methods of the present invention provide a significant advancement in airbag design. The tethering assemblies of the present invention enable cushions of inflatable curtain modules to be firmly restrained from inward or outward motion, thereby protecting vehicle occupants against bag slap and excursion from the vehicle. Such protection can be accomplished within a compact space, so that comprehensive protection can be extended to passengers of trucks, SUVs, and other vehicles in which space rearward of the cushions is limited. Furthermore, the tethering assemblies may be economically manufactured and installed, and may be used with rolled or accordion folded cushions.

The present invention may be embodied in other specific forms without departing from its structures, methods, or other essential characteristics as broadly described herein and claimed hereinafter. The described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

What is claimed and desired to be secured by United States Letters Patent is:

1. An inflatable curtain module configured to provide side impact protection for an occupant of a vehicle, the inflatable curtain module comprising:
   a cushion configured to inflate in an inflation direction inward of a lateral surface of the vehicle;
   a tether attached to a lower portion of the cushion, the tether having a first end, a second end, and an intermediate portion between the first and second ends, wherein the first and second ends are attached together to form a loop;
   a lower anchor attachable to a vehicle surface proximate a deployed position of the lower portion of the cushion, wherein the lower tether anchor is configured to slidably retain the intermediate portion to exert tension on the lower portion of the cushion when the cushion is inflated; and
   a tensioning ring positioned to encircle a portion of the loop to draw opposing portions of the loop toward each other, thereby increasing tension exerted on the cushion in the deployed position.

2. The inflatable curtain module of claim 1, wherein the intermediate portion is slidably retained proximate an upper portion of the cushion.

3. The inflatable curtain module of claim 2, further comprising an upper anchor attachable to the vehicle surface proximate the upper portion to slidably retain the intermediate portion.

4. The inflatable curtain module of claim 3, wherein the upper anchor is disposed at a position selected such that the lower and upper anchors are disposed substantially on a single vertical line.

5. The inflatable curtain module of claim 1, wherein the lower anchor is positioned rearward of the cushion to exert tension on the cushion in a rearward direction, the inflatable curtain module further comprising a front tether attached to the cushion to exert tension on the cushion in a forward direction so that the lower portion is drawn taut.

6. The inflatable curtain module of claim 1, wherein the tether is substantially inelastic.

7. The inflatable curtain module of claim 1, wherein the lower anchor is positioned rearward of the cushion to exert tension on the cushion in a rearward direction for a vehicle having an abrupt rear surface rearward of the inflatable curtain module.

8. The inflatable curtain module of claim 1, wherein the first and second ends are sewn together, and wherein the first end is sewn to the lower portion.

9. The inflatable curtain module of claim 1, further comprising a locking mechanism configured to prevent motion of the first end away from the lower anchor when the cushion is in the deployed position.

10. The inflatable curtain module of claim 9, wherein the locking mechanism comprises a rotatable cam and a bracket, wherein the rotatable cam rotates to grip the intermediate portion in response to tension tending to pull the first end away from the lower anchor.

11. An inflatable curtain module configured to provide side impact protection for an occupant of a vehicle, the inflatable curtain module comprising:
   a cushion configured to inflate in an inflation direction inward of a lateral surface of the vehicle;
   a tether having a first end attached to a lower portion of the cushion, a second end attached to at least one of the cushion and the first end, and an intermediate portion between the first and second ends, wherein the tether is substantially inelastic;

a lower anchor attachable to a vehicle surface proximate a deployed position of the lower portion of the cushion, wherein the lower tether anchor is configured to slidably retain the intermediate portion to exert tension on the lower portion of the cushion when the cushion is inflated; and a locking mechanism configured to prevent motion of the first end away from the lower anchor when the cushion is in the deployed position.

12. The inflatable curtain module of claim 11, wherein the intermediate portion is slidably retained proximate an upper portion of the cushion.

13. The inflatable curtain module of claim 12, further comprising an upper anchor attachable to the vehicle surface proximate the upper portion to slidably retain the intermediate portion.

14. The inflatable curtain module of claim 13, wherein the upper anchor is disposed at a position selected such that the lower and upper anchors are disposed substantially on a single vertical line.

15. The inflatable curtain module of claim 11, wherein the second end is attached to the first end such that the tether forms a loop.

16. The inflatable curtain module of claim 15, further comprising a tensioning ring positioned to encircle a portion of the loop to draw opposing portions of the loop toward each other, thereby increasing tension exerted on the cushion in the deployed position.

17. The inflatable curtain module of claim 11, wherein the intermediate portion is formed of a fabric webbing material.

18. The inflatable curtain module of claim 17, wherein the locking mechanism comprises a rotatable cam and a bracket, wherein the rotatable cam rotates to grip the intermediate portion in response to tension tending to pull the first end away from the lower anchor.

19. The inflatable curtain module of claim 11, wherein the lower anchor is positioned rearward of the cushion to exert tension on the cushion in a rearward direction for a vehicle having an abrupt rear surface rearward of the inflatable curtain module.

20. The inflatable curtain module of claim 11, wherein the lower anchor is positioned rearward of the cushion to exert tension on the cushion in a rearward direction, the inflatable curtain module further comprising a front tether attached to the cushion to exert tension on the cushion in a forward direction so that the lower portion is drawn taut.

21. A tethering assembly for exerting tension on a cushion of an inflatable curtain module configured to provide side impact protection for an occupant of a vehicle, the tethering assembly comprising:

a tether attached to the cushion, the tether having a first end and a second end attached to the first end such that the tether forms a loop;

a lower anchor attachable to a vehicle surface proximate a deployed position of a lower portion of the cushion to slidably retain the tether; and a tensioning ring positioned to encircle a portion of the loop to draw opposing portions of the loop toward each other, thereby increasing tension exerted on the cushion in the deployed position.

22. The tethering assembly of claim 21, wherein the tensioning ring is attached to the first end.

23. The tethering assembly of claim 21, further comprising an upper anchor attachable to the vehicle surface proximate an upper portion of the cushion to slidably retain the tether.

24. A tethering assembly for exerting tension on a cushion of an inflatable curtain module configured to provide side impact protection for an occupant of a vehicle, the tethering assembly comprising:

a tether attached to a lower portion of the cushion, the tether having a first end and a second end attached to the first end such that the tether forms a loop;

a lower anchor attachable to a vehicle surface proximate a deployed position of a lower portion of the cushion to slidably retain the tether; and a locking mechanism configured to prevent motion of the first end away from the lower anchor when the cushion is in the deployed position.

25. The tethering assembly of claim 24, wherein the first end is attached to the lower portion of the cushion.

26. The tethering assembly of claim 24, wherein the lower anchor is positioned rearward of the cushion to exert tension on the cushion in a rearward direction for a vehicle having an abrupt rear surface rearward of the inflatable curtain module.

* * * * *